United States Patent [19]

Couture

[11] Patent Number: 4,873,749

[45] Date of Patent: Oct. 17, 1989

[54] METHOD AND APPARATUS FOR SUPPORTING ANIMAL CARCASSES AND PULLING HIDES THEREFROM

[75] Inventor: William F. Couture, Amarillo, Tex.

[73] Assignee: IBP, Inc., Dakota City, Nebr.

[21] Appl. No.: 144,009

[22] Filed: Jan. 15, 1988

[51] Int. Cl.⁴ .......................... A22C 25/02; A22B 5/16
[52] U.S. Cl. .......................................... 17/50; 17/21;
17/44.3
[58] Field of Search ....................... 17/21, 50, 44, 44.3

[56] References Cited

U.S. PATENT DOCUMENTS

| | | | |
|---|---|---|---|
| 4,021,883 | 5/1977 | Schmidt, Jr. | 17/21 |
| 4,164,056 | 8/1979 | Hilgner et al. | 17/21 |
| 4,653,149 | 3/1987 | Swilley | 17/21 |

Primary Examiner—Willis Little
Attorney, Agent, or Firm—Beveridge, DeGrandi & Weilacher

[57] ABSTRACT

Hides are pulled over the heads of horizontally moving animal carcasses while the carcasses are simultaneously supported by a trolley rail and a pair of leg gripping assemblies. Each leg gripping assembly has a pair of extensible jaw members which, when closed, form a leg receiving space which has a generally vertical inclined axis. The leg gripping assemblies are mounted on a frame which is driven forwardly parallel to the trolley rail by a pusher dog on a chain. The pusher dog chain is drivingly connected to a chain which drives the trolleys along the rail.

20 Claims, 3 Drawing Sheets

METHOD AND APPARATUS FOR SUPPORTING ANIMAL CARCASSES AND PULLING HIDES THEREFROM

BACKGROUND OF THE INVENTION

This invention relates to the meatpacking industry, and specifically to an apparatus and method used in connection with pulling hides from slaughtered livestock animals.

It has been particularly useful to process beef carcasses using the method generally disclosed in U.S. Pat. No. 3,810,277, the disclosure of which is incorporated herein by reference. According to this known method, an ascending loop is used to strip the hide from the loin, highback, flank, rump and tail areas. There is some loosening of the hanging hide using rotary knives which are manipulated by slaughterhouse personnel. The hanging hide is then pulled downwardly either by linear motion or by rotation about a rotary device, preferably while an electrical current is run through the carcass to reduce the risk of vertebrae separation. During this downpulling step, the hide is everted as it is pulled from the head, and then is removed from the downpuller station for further processing.

The downpulling operation requires the exertion of very large forces which can sometimes pull carcasses from the rail. The manual trimming operations with rotary knives sometimes removes excessive meat from the carcass and thus reduces the yield realized in the slaughterhouse operation.

One objective of the present invention is to reduce the amount of trimming which is required prior to the downpulling operation. This reduces labor costs and also reduces waste which otherwise arises when meat is cut so as to remain on the hide rather than the carcass. This objective is realized because less trimming is required due to the larger forces which can be exerted during the downpulling operation.

Another object of the invention is to reduce the number of incidents when the downpuller pulls the carcass off of its rail or other support.

Another object of the invention is to reduce the number of incidents when the downpuller pulls the carcass off of its rail or other support.

SUMMARY OF THE INVENTION

This invention relates to a method and apparatus for holding the legs of an animal carcass while a hide pulling machine pulls the hide toward and over the head of the carcass.

The apparatus according to the invention includes a means for suspending the carcass, and two leg gripping assemblies for gripping the legs of the carcass against forces imposed thereon when the hide is pulled toward the head of the carcass. Each leg gripping assembly has a jaw actuator means which moves a pair of jaws between open and closed positions. When the jaws are in the open position, they are spaced apart a distance which permits the lateral entry thereinto and exit therefrom of a leg of a carcass; and, when the jaws are in their closed position, they grip a leg of a carcass positioned therebetween.

The apparatus preferably includes means for pulling the hide toward and over the head of the carcass. The leg receiving space defined by the jaws is generally vertical and it has an axis which is inclined in a direction which extends from the leg gripping assembly toward the hide pulling means. This orientation is desirable because it reduces the risk of leg breakage during the leg gripping and hide pulling operations.

Another feature of the invention is that the leg gripping assemblies are mounted for movement in a direction which is parallel to the direction of carcass movement, and they are propelled at a velocity which corresponds with that of the carcass-suspending trolleys. In this regard, the leg gripping assemblies are mounted on a movable frame. The carcasses are suspended from trolleys which are driven along a rail by a trolley driving chain. A frame moving means is disconnectibly engageable with the frame in order to propel the frame at a velocity which corresponds with that of the trolleys. Preferably, the frame moving means is a chain, and a drive connection is provided to receive drive forces from one chain and deliver drive forces to the other chain.

The frame moving chain may have a frame pushing surface. With such an arrangement, the frame which supports the leg gripping assemblies is provided with an interlock member which is movable from an operative position where it is in the path of the frame pushing surface on the chain to an inoperative position where it is spaced from the path of the frame pushing surface so as to disconnect the frame from the frame moving chain.

The method according to the invention includes the steps of suspending the carcass from a suspending means, gripping the legs of the carcass with two leg gripping assemblies which hold the carcass against forces imposed thereon when the hide is pulled toward the head, and operating an actuator means which produces relative movement between the jaws of the leg gripping assembly so that the jaws move from an open position to a closed position. When in the open position, the jaws are spaced apart a distance which permits the lateral entry thereinto and exit therefrom of a carcass leg; and, when the jaws are in their closed position, they grip the leg of the carcass.

The method is performed in a manner which positions the leg receiving space between the jaws so that its axis is generally vertical and inclined in a direction which extends from the leg gripping assemblies toward the hide pulling means. Preferably, the carcass is suspended from trolleys which are driven along a horizontal rail by a chain. The leg gripping assemblies are mounted on a frame which is engaged with a disconnectible moving means which propels the frame at a velocity corresponding to that of the trolleys. Preferably, drive forces are delivered from a trolley driving chain to the frame moving means which has the frame pushing surface. An interlock member on the frame is moved to an operative position where it is in the path of the frame pushing surface of a frame moving chain. To disconnect the frame from the frame moving chain, the interlock member is moved to an inoperative position which is displaced from the path of the frame pushing surface on the frame driving chain.

Although the invention can be performed by many types of apparatus and may involve a variety of different steps, a preferred embodiment thereof is shown in the accompanying drawings and described in the detailed description which follows.

DETAILED DESCRIPTION

Figure 1:
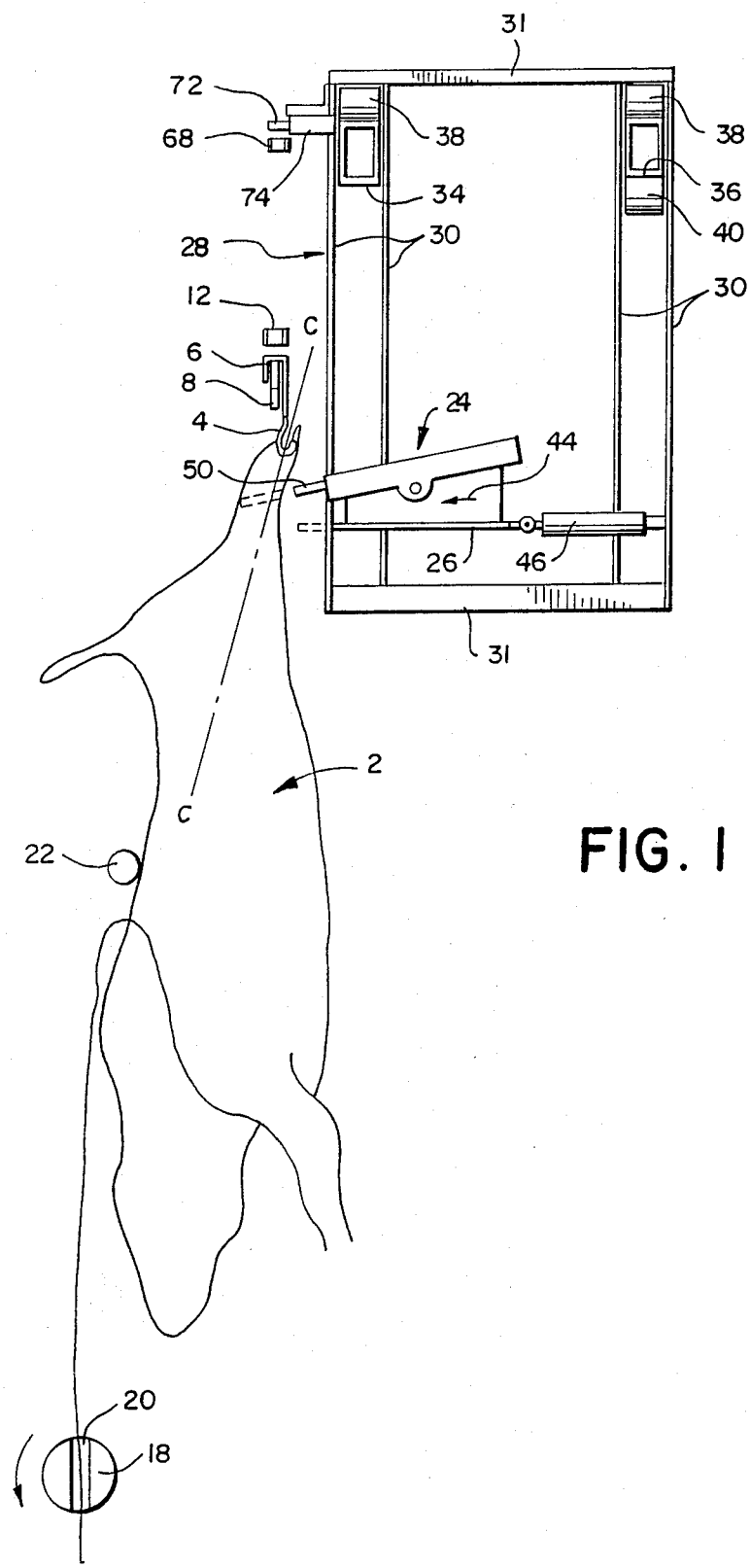
FIG. 1 is a diagrammatic elevational view of an apparatus constructed according to the invention, looking in the downstream direction of carcass travel at the downpuller station.

Referring to FIG. 1, it will be seen that a carcass 2 is supported by a hook 4 which is mounted on a trolley 6. The trolley has a wheel which rides on the upper surface of a horizontal rail 8. One such trolley is used for each leg of an animal in a conventional manner. These trolleys are propelled in a forward direction along the rail by dogs 10 which are attached to a drive chain such as the one diagrammatically illustrated at 12. The chain 12 is driven by a sprocket 14 which is connected to a motor 16, using gearing and speed controls as may be necessary. The details of this type of carcass conveyor are well known and do not require further explanation to those familiar with the industry.

At the downpuller station illustrated in FIG. 1, there is a hide pulling means in the form of a motor-driven rotating member 18 which has a hide-receiving slot 20 formed therein. Rotation of the member 18 in the illustrated counter-clockwise direction causes the hide to wrap around the member so that the hide is pulled toward and over the head of the carcass. The member 18 is located where it is not vertically aligned with the carcass-suspending rail 8. Due to this relationship, the operation of the hide pulling machine 18 tends to swing the lower end of the carcass in a direction which is leftward as seen in FIG. 1, pulling the carcass 2 into a spring-mounted electric shocker bar 22 and also tending to exert a leftward force on the hook 4, trolley 6 and rail 8.

Figure 2:
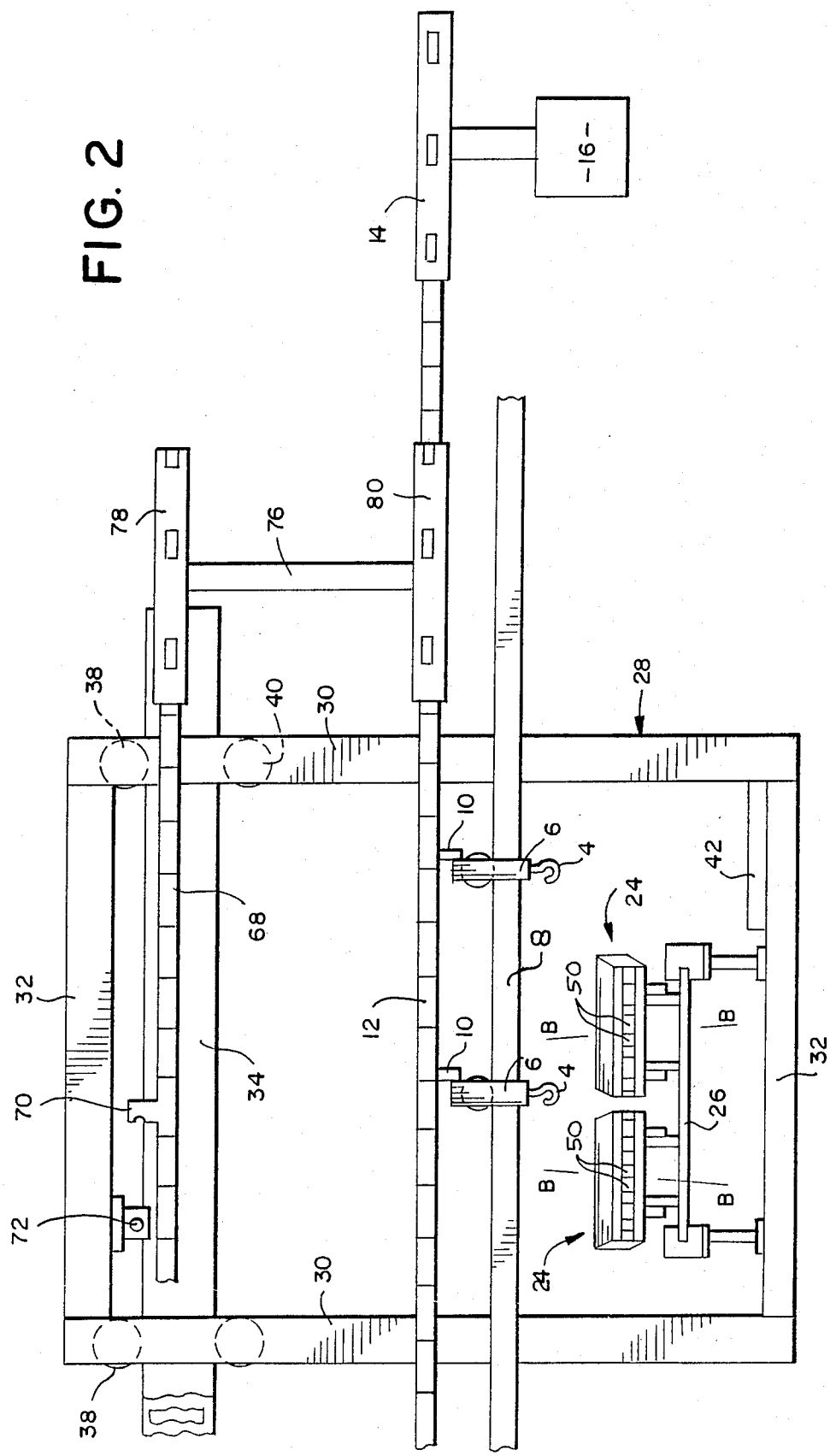
FIG. 2 is a somewhat diagrammatic front elevation of an apparatus constructed according to the invention.

According to the present invention, there are means for providing supplemental support to the carcass during the downpulling operation. Preferably, thee invention utilizes a pair of leg gripping assemblies which grip the legs of a suspended carcass to hold the carcass against forces imposed thereon when the hide is pulled. These leg gripping assemblies are generally designed 24 in FIGS. 1 and 2 where it will be seen that they are mounted on a horizontally movable slider plate 26. These assemblies 24 are contained in individual housings which are shown in FIGS. 1 and 2 but are removed in FIG. 3 for illustrative purposes.

The leg gripping assemblies 24 and slider plate 26 are mounted on a relatively large frame 28 which, in the diagrammatic version illustrated, includes a plurality of vertical frame members 30 and a plurality of horizontal frame members 32. The frame is supported on a pair of large tubular stationary rails 34 and 36 which are oriented parallel to the conveyor rail 8 and the path of carcass movement. As shown in FIGS. 1 and 2, the frame has wheels 38 which ride on the horizontal upper surfaces of the front and rear rails 34 and 36, and wheels 40 which ride on the lower horizontal surface of the rear rail 36. Preferably, the frame also has wheels which ride on the vertical surfaces of the rails 34 and 36 which face inwardly toward each other, thus deterring horizontal movement of the frame 28 toward the conveyor rail 8.

The frame is provided with an operator platform 42 if desired. Adjacent to this platform, there is the slider plate 26 which is movable in the direction represented by the arrow 44 in FIG. 1. This movement is produced by a double acting hydraulic cylinder 46. The leg gripping assemblies 24 are mounted on the slider plate 26 so that when the slider plate moves in a direction which is leftward in FIG. 1, the leg gripping jaws are moved to an extended position wherein each leg of the carcass is located between the two jaws of a leg gripping assembly.

Figure 3:
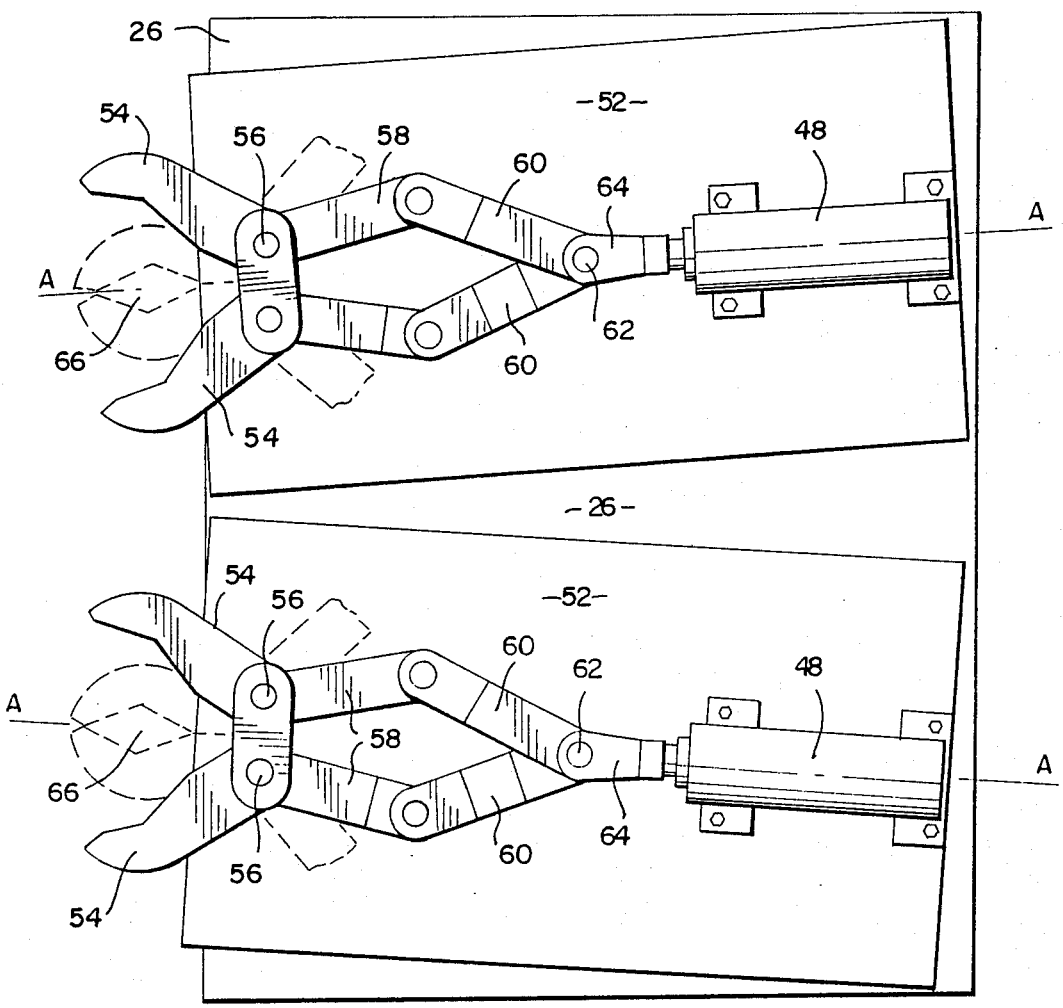
FIG. 3 is a plan view of a leg gripping apparatus constructed according to the invention.

Referring to FIG. 3, it will be seen that each of the leg gripping assemblies includes a jaw actuator means in the form of a cylinder 48 which moves the jaws 50 between open and closed positions. The open position is shown in solid lines and the closed position is shown in broken lines. When the jaws 50 are in the open position, they are spaced apart a distance which permits the lateral entry thereinto and the exit therefrom of a leg of a carcass.

Each jaw assembly is mounted on a base plate 52 which is supported on the slider plate 26. These plates 52 may be tiltable on the slider plate for adjustment purposes, and turnbuckle-like devices can be used to hold them at an optimum angular position. The jaw assemblies are oriented so that their axes A—A are slightly convergent toward the carcass in plan view. These axes are also inclined about ten degrees from the horizontal. The pivot axes of the jaws are inclined so as to converge in an upward direction as shown at B—B in FIG. 2.

Each jaw assembly has two jaw members 54 which are supported on pivots 56 which are stationary with respect to the slider plate 26. Each jaw member 54 has the leg-engaging jaw portion 50 which extends forwardly from the pivot, and a lever portion 58 which extends rearwardly from the pivot. These lever portions 58 are pivotally connected to links 60 by pins 61, and the links 60 are both pivotally connected by a pin 62 to a clevis 64 on the rod of the jaw actuator cylinder 48.

When the jaws are in their closed positions, they define a leg-receiving space 66 with a generally vertical axis C—C which is inclined in a direction which extends from the jaw assembly toward the hide pulling means. The orientation of this axis is shown in FIG. 1.

Figure 4:
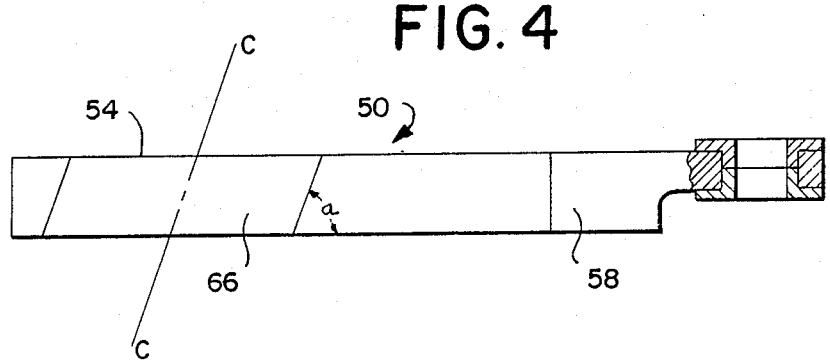
FIG. 4 is a view as seen along the line 4—4 in FIG. 3, illustrating the orientation of the leg-receiving space of a jaw assembly constructed according to the invention.

Referring to FIG. 4, it will be seen that the leg-contacting surfaces of the jaws are inclined at an angle a of about seventy degrees to the upper and lower surfaces of the jaws. In this case, when the axes A—A of the leg gripping assemblies are inclined about ten degrees from the horizontal, the axis C—C has an inclination from the horizontal of about eighty degrees. This configuration and orientation is important as it permits the leg of the carcass to pivot or swivel slightly in the jaws, thus accommodating the previously-mentioned swinging movement of the carcass which occurs during the hide pulling operation. This reduces the risk of bone breakage which, if severe, can cause the apparatus to pull suspended carcasses down from the rail.

Preferably, the leg gripping devices 24 are driven in a direction and at a velocity which correspond to the movement of the carcass trolleys 6 on the rail 8. An effective way to achieve this is to utilize a separate and synchronized means for moving the frame 28 which carries the leg gripping devices. In the embodiment shown in FIG. 2, the frame 28 is driven in a leftward direction by an auxiliary chain 68 which has a plurality of upstanding pusher dogs 70 which move in a path adjacent to the frame. Each of these dogs has a forwardly facing, horizontal semicylindrical frame-pushing surface. On the frame, there is an indexing interlock pin 72 which is moved by a cylinder 74 from a retracted inoperative position where it is displaced from the path of the dogs 70, to an extended operative position where it lies in the path of the dogs 70 so the frame will be driven forwardly by the chain 68. It will be apparent that this also causes forward propulsive movement of the leg gripping devices 24. When the surface of a pusher dog 70 is engaged against the extended interlock member, the frame 28 and the leg gripping devices will be propelled in a forward direction at a velocity which corresponds with that of the carcass and trolleys 6. The frame moving chain 68 is driven by a drive connection means which receives forces from the trolley drive chain 12. This drive connection includes a vertical shaft 76 which has conventional sprockets 78 and 80 at its upper and lower ends, and these sprockets are engaged with the chains 12 and 68.

The operation of the apparatus will be evident from the foregoing description. Each carcass, typically a beef carcass, is supported on two trolleys 6 which are connected respectively to the two legs of the animal. The trolleys 6 are supported on the ail 8, and they are driven in a forward direction by the dogs 10 on the chain 12. While moving enroute to the downpuller station, various operations are performed as described in U.S. Pat. No. 3,810,277 so that the carcass arriving at the downpuller station has the hide hanging downwardly while still being connected to the head and possibly shoulder area of the animal. The lower end of the hide is engaged by the downpuller machine 18 which exerts a downwardly directed hide pulling force. However, before this force is exerted, the jaws 50 of the leg gripping assemblies 24 are closed to engage the legs of the carcass, preferably immediately adjacent to the rear hock joint so that this joint lies between the trolley and the jaws 50 of the leg gripping assemblies 24.

As the chains 12 and 68 move in a forward direction, it will be understood that the trolley driving chain 12 will be pushing the trolleys 6 while a dog 70 on the chain 68 is moving toward the frame. The frame 28 is at an initial position which is slightly upstream of the hide puller, and the interlock pin 72 is in its extended operative position where it lies in the path of the pusher dog 70. The dog 70 engages the pin 72 and starts moving the frame at a velocity and in a direction which correspond with the carcass-suspending trolleys 6. Once this movement commences, a limit switch causes the hydraulic cylinder 46 to move the slider plate 26 to an extended position where the carcass legs will be located between the open jaws 50 of the leg gripping assemblies 24. Arrival of the slider plate at tits extended position operates a limit switch which operates the jaw actuator cylinders 48. This extends the cylinder rod and clevis 64 so that the links 60 move the jaw members 54 about their respective pivots 56 to move the jaws from their open positions to their closed positions. Once the jaws are closed, the hide is pulled from the carcass by thee hide pulling means 18. This exerts forces on the carcass 2 and hide which are primarily vertical but have horizontal components to the extent that the hide swings in a leftward direction as seen in FIG. 1. There is positive engagement of the carcass against the electric shocker bar 22, and the leg pivots or swivels in the jaws 50. During this operation, the carcass is simultaneously supported by the trolley and by the leg gripping assemblies on the frame.

When the hide pulling step is completed, the cylinders 48 are retracted to open the jaws 50. The slider plate cylinder 46 is retracted, and the pin 72 is retracted from the path of the dog 70 on the chain 68. This releases the frame so that it returns to its initial position. This return movement may be produced by a counterweight which is connected to the frame by a cable which passes over a sheave. The interlock pin is returned to is extended operative position so that it will be engaged and moved forwardly by the next pusher dog on the frame driving chain.

Most operations of the apparatus are controlled by limit switches which, through conventional electrical circuits, operate valves in the hydraulic lines connected to the various hydraulic cylinders. For example, at the beginning of each cycle, the interlock pin 72 is extended n response to actuation of a limit switch on frame 28 by a target which is affixed to the chain 68 approximately three feet behind pusher dog 70. The arrival of the pin 72 at its extended position operates a limit switch which causes the cylinder 46 to move the slider plate 26 to its extended position. When the slider plate reaches its extended position, another limit switch is operated to activate the cylinders 48 to close the jaws 50.

When the frame 28 reaches the end of its movement in the direction of carcass travel, a limit switch on the frame engages a stationary target. This operates causes the cylinders 48 to open the jaws 50. The opening movement of the jaws actuates a limit switch which causes the cylinder 46 to retract the slider plate 26. This retractive movement is terminated by another limit switch which also operates the cylinder 74 to retract the interlock pin 72. Finally, when the frame 28 returns to it park or home position, a limit switch on frame 28 is operated by a stationary target to reset the system so that the next cycle may be initiated by the limit switch target on the chain 68.

Persons familiar with the field of the invention will realize that many variations are possible to the basic principles disclosed in this specification. Therefore, it is emphasized that the invention is not limited only to the disclosed embodiment, but embraces modifications thereof which are quite diverse but fall within the spirit of the following claims.

I claim:

1. Apparatus for holding the legs of an animal carcass while a hide pulling machine pulls the hide of the carcass toward and over the head of the carcass, comprising, means for suspending a carcass with its head hanging downwardly, two leg gripping assemblies positioned near said suspending means for gripping the legs of a carcass on the suspending means to hold the carcass against forces imposed on the carcass when the hide is pulled downwardly toward the head of the carcass, each said leg gripping assembly including a pair of jaws which are relatively movable from an open position to a closed position where they define a leg receiving space and are operable to grip a leg of a carcass therebetween, each of said leg gripping assemblies while its jaws are in said open position being spaced apart a distance which permits the entry thereinto and exit therefrom of a leg of a carcass, and jaw actuator means for moving the jaws between said open and closed positions.

2. The apparatus of claim 1 including hide pulling means for pulling the hide of a carcass on said suspending means, said hide pulling means being operable to pull the hide toward and over the head of the carcass.

3. The apparatus of claim 2 wherein, when the jaws are in their closed positions, said leg receiving space is generally vertical and having an axis which is inclined in a direction which extends from the leg gripping assemblies toward the hide pulling means.

4. The apparatus of claim 1 or 2 wherein the means for suspending a carcass includes a horizontal rail and trolleys which are movable along said rail, a frame, said leg gripping assemblies being mounted on said frame, said frame and the leg gripping assemblies thereon being supported for movement in a direction which is generally parallel to said rail, a trolley driving chain means operatively connected to the trolleys for propelling the trolleys along the rail, a frame moving means which is disconnectibly engageable with the frame, said frame moving means being operable when it is engaged with the frame to propel the frame at a velocity which corresponds with that of the trolleys.

5. The apparatus of claim 4 wherein the frame moving means is a chain means, drive connection means which receives drive forces from one said chain means and delivers drive forces to another said chain means.

6. The apparatus of claim 4 wherein the frame moving means is a chain means which has a frame pushing surface thereon, said frame pushing surface being movable in a path which is adjacent to said frame, and interlock member which is mounted on the frame and is movable from an inoperative position to an operative position, said operative position of the interlock member being in said path of the frame pushing surface on the frame driving chain means so that the chain and pushing surface will push the interlock member and the frame in a forward direction, said inoperative position of the interlock member being displaced from the path of the frame pushing surface so as to disconnect the frame from the frame moving chain means.

7. The apparatus of claim 1 or claim 2 wherein the suspending means includes a horizontal rail and trolleys which are movable along said rail, said leg gripping assemblies being movable in a direction which is generally parallel to said rail at a velocity which corresponds with that of the trolleys.

8. Apparatus for holding the legs of an animal carcass while a hide pulling machine pulls the hide of the carcass toward and over the head of the carcass, comprising, rail means for suspending a carcass, two leg gripping assemblies for gripping the legs of a carcass on the suspending means to hold the carcass against forces imposed on the carcass when the hide is pulled toward the head of the carcass, each said leg gripping assembly including a pair of jaws which are relatively movable from an open position to a closed position where they define a leg receiving space and are operable to grip a leg of a carcass therebetween, each of said leg gripping assemblies while its jaws are in said open position being spaced apart a distance which permits the entry thereinto and exit therefrom of a leg of a carcass, jaw actuator means for moving the jaws between said open and closed positions, said apparatus including a frame which is movable in a direction which is generally parallel to the rail means, said leg gripping assemblies being supported on the frame, a driven chain, and at least one frame pushing means affixed to said driven chain for pushing said frame in a direction which is generally parallel to said rail means.

9. The apparatus of claim 8 wherein the frame has an interlock member which is positioned for engagement by the frame pushing means on the driven chain, said apparatus having means for retracting the interlock member from the frame pushing means to permit the frame to return to a start position where the apparatus stands ready to receive a subsequent carcass.

10. The apparatus of claim 8 including hide pulling means for pulling the hide of a carcass supported on said rail means, said hide pulling means being operable to pull the hide toward and over the head of the carcass.

11. Apparatus for holding the legs of an animal carcass while a hide pulling machine pulls the hide of the carcass toward and over the head of the carcass with its head hanging downwardly, comprising, means for suspending a carcass, two leg gripping assemblies positioned near said suspending means for gripping the legs of a carcass on the suspending means to hold the carcass against forces imposed on the carcass when the hide is pulled downwardly toward the head of the carcass, each said leg gripping assembly including a pair of jaws which are relatively movable from an open position to a closed position where they define a leg receiving space and are operable to grip a leg of a carcass therebetween, each of said leg gripping assemblies while its jaws are in said open position being spaced apart a distance which permits the entry thereinto and exit therefrom of a leg of a carcass, jaw actuator means for moving the jaws between said open and closed positions, said jaws having leg gripping surfaces which are shaped to provide therebetween a leg receiving space when the jaws are in their closed positions, and leg receiving space having an axis which is inclined and generally vertical.

12. The apparatus of claim 11 including hide pulling means for pulling the hide of a carcass on said suspending means, said hide pulling means being operable to pull the hide toward and over the head of the carcass, said axis of the leg receiving space being inclined in a direction which extends from the leg gripping assemblies toward the hide pulling means.

13. The apparatus of claim 11 wherein the axis of the leg receiving space is inclined about 80 degrees from horizontal.

14. The method of pulling the hide of an animal carcass toward and over the head of the carcass with a pulling machine, comprising the steps of, suspending the carcass from a suspending means with its head hanging downwardly, gripping the legs of the carcass near the suspending means with two leg gripping assemblies, holding the carcass with said leg gripping assemblies to resist downward forces imposed on the carcass when the hide is pulled toward the head of the carcass, each said leg gripping assembly including a pair of jaws which are relatively movable from an open position to a closed position, said jaws while in said open position being spaced apart a distance which permits the entry thereinto and exit therefrom of a leg of a carcass, said jaws while in said closed position defining a leg receiving space and gripping a leg of a carcass therebetween, and operating an actuator means which moves the jaws between said open and closed positions.

15. The method of claim 14 wherein the jaws are oriented so as that said leg receiving space is generally vertical and has an axis which is inclined in a direction which extends from the leg gripping assemblies toward the hide pulling machine.

16. The method of claim 14 wherein the carcass is suspended from a trolley which moves along a horizontal rail, and said leg gripping assemblies are mounted on a frame which is supported for movement in a direction which is generally parallel to said rails, driving the trolleys with a chain which propels the trolleys along the rail; and disconnectibly engaging the frame with a frame moving means which, when engaged, propels the frame at a velocity which corresponds with that of the trolleys.

17. The method of claim 16 wherein the frame moving means is a chain; said method including the step of delivering drive forces from one said chain to another said chain.

18. The method of claim 16 wherein the frame moving means is a chain which has a frame pushing surface thereon, and the method includes the steps of moving said frame pushing surface in a path which is adjacent to said frame, moving an interlock member which is mounted on the frame to an operative position where it is in said path of the frame pushing surface so that the frame pushing surface pushes the interlock member and the frame in a forward direction, and moving said interlock member to an inoperative position which is displaced from the path of the frame pushing surface so as to disconnect the frame from the frame moving chain.

19. The method of claim 14 wherein the carcass is suspended from trolleys which move along a horizontal rail, said method including the step of moving said leg gripping assemblies in a direction which is generally parallel to said rail at a velocity which corresponds with that of the trolleys.

20. The method of claim 14 wherein the carcass is suspended from trolleys, said method including the step of moving the trolleys along a horizontal rail, said hide pulling step being performed while the carcass is simultaneously supported by the rail and the leg gripping assemblies.

* * * * *